3,752,775
CATALYST FOR OXIDATION AND A METHOD FOR PRODUCING THE SAME

Goro Yamaguchi, Tokyo, and Yasuo Nishikawa, Kazuhiro Yoshizaki, and Susumu Komatsu, Okayama-ken, Japan, assignors to Kyushu Taika Renga Kabushiki Kaisha, Okayama-ken, and Goro Yamaguchi, Tokyo, Japan
No Drawing. Filed Mar. 29, 1971, Ser. No. 129,178
Claims priority, application Japan, Mar. 6, 1971, 46/11,695
Int. Cl. B01j 11/06, 11/08
U.S. Cl. 252—464    7 Claims

ABSTRACT OF THE DISCLOSURE

A catalyst for oxidation and a method for producing the same, in which said catalyst consists any one of:

(A) alkali polyaluminate,
(B) a mixture of said alkali polyaluminate and another refractory material,
(C) a mixture of said (A) as catalyst carrier or promotor and other catalytic material, or
(D) a mixture of said (B) as catalyst carrier or promotor and other catalytic material.

---

This invention relates to a catalyst for oxidation and a method for producing the same.

Furthermore, this invention relates to a catalyst for oxidation and a method for producing the same, in which said catalyst consists any one of:

(A) alkali polyaluminates,
(B) a mixture of said alkali polyaluminates and other refractory materials,
(C) a mixture of said (A) as catalyst carrier or promotor and other catalytic materials, or
(D) a mixture of said (B) as catalyst carrier or promotor and other catalytic materials.

$\beta$-$Al_2O_3$, which is a mineral having the composition of $R_2O \cdot 11Al_2O_3$ (wherein R is Na or K), has been known as one of the conventional alkali polyaluminates; and the existence of two new alkali polyaluminates, these being $\beta'$-alumina and $\beta''$-alumina respectively having the composition of $R_2O \cdot 7$–$8Al_2O_3$ and $R_2O \cdot 5$–$6Al_2O_3$ (wherein R is K or Na), which have a higher content of an alkali metal, has been found by Yamaguchi and others who are among the inventors (refer to Bulletin of the Chemical Society of Japan, vol. 41, No. 1, pp. 93–99 (1968)). The term "alkali polyaluminates" used herein designates sodium and potassium polyaluminates in which both said conventional and new polyaluminates are included.

Still more, this invention relates to a catalyst for oxidation reactions such as conversion of carbon monoxide, cleaning of exhaust gas of automobiles, and conversion of $SO_2$ in sulfuric acid producing processes.

It is heretofore known that alkali metals such as potassium and sodium are effective as the catalyst or promotor for the above-mentioned oxidation reactions. And yet, in case that these alkali metals are employed in a high temperature or reductive condition, said alkali metals are liable to fly off in vapor together with the produced gas, and then deposits on low temperature portions to cause unexpected troubles. Further, the catalytic activity in a low temperature is gradually lowered with the vaporization of the alkali metals. Accordingly, the catalyst for oxidation which being added with such alkali metals is not used much because the degradation of the catalytic activity is rapid, for all the superior activity in the initial stage of the reaction.

The object of the present invention is to eliminate the above-mentioned defects encountered in the use of the ordinary catalyst for oxidation.

That is, the inventors have found that the above defects can be swept away by using the catalyst of the present invention. Wherein the catalyst of the invention consists any one of:

(A) At least one alkali polyaluminate selected from the group consisting of $\beta$-alumina: $K_2O \cdot 11Al_2O_3$ and $Na_2O \cdot 11Al_2O_3$, $\beta'$-alumina: $K_2O \cdot 7$–$8Al_2O_3$ and $$Na_2O \cdot 7\text{–}8Al_2O_3$$

and $\beta''$-alumina: $K_2O \cdot 5$–$6Al_2O_3$ and $Na_2O \cdot 5$–$6Al_2O_3$, (B) A mixture of said alkali polyaluminate and other refractory material, in which the amount of said alkali polyaluminate being not less than 0.5 percent by weight calculated as $K_2O$ or $Na_2O$, (C) A mixture of said (A) as catalyst carrier or promoter and other catalytic material, in which said catalytic material is at least one member selected from the group consisting of palladium, platinum, cobalt, manganese, chromium, nickel, copper, iron, vanadium, silver, tin and their compounds, or (D) A mixture of said (B) as catalyst carrier or promotor and at least about 1% by weight of other catalytic material as defined in the above (C).

The above-mentioned alkali polyaluminates are hardly decomposed by a long time exposure to a reductive condition under the elevated temperature, therefore, the contained alkali polyaluminates are hardly fly off in vapor, in addition to that the catalyst of the invention keeps a superior effect for a long period of time as for the oxidation reaction.

Further, the catalyst of the invention keeps its activity in a low temperature condition for a long time, and alkali polyaluminates in the catalyst has a superior effect to suppress the formation of free carbon in the oxidation of hydrocarbons. Therefore, the catalyst of the invention is especially suitable for the reactions which are liable to cause troubles by free carbon, such as the conversion of a high calorific oil gas containing relatively large amount of unsaturated hydrocarbons and the cleaning of exhaust gas from automobiles containing large amount of un-ignited fuel of hydrocarbons.

The catalyst for oxidation of the invention can be prepared as follows.

For example, alkali polyaluminate itself or a mixture with a suitable refractory material is pelleted in appropriate forms and then baked to obtain the catalyst. Or, the above-mentioned catalyst is used as a carrier, in which the carrier is immersed into an aqueous solution of an inorganic salt or organic salt of palladium, platinum, cobalt, manganese, chromium, nickel, copper, iron, vanadium, silver or tin, and then it is taken out and dried or baked at a lower temperature (Immersion method). Further, alkali polyaluminate or a mixture of alkali polyaluminate and a refractory material is added into a solution of said inorganic or organic salt of catalytic material, thus mixing them thoroughly and co-precipitate thereof is obtained. Then the precipitate is filtered and rinsed and thereafter is pelleted and dried (Co-precipitation method). Still other method to obtain the catalyst is such that, said alkali polyaluminate or a mixture of alkali polyaluminate and a refractory material is mixed with dry powder of said catalytic material and pelleted to obtain a catalyst.

The refractory materials as used for the catalyst of the present invention are preferably neutral oxides or basic oxides such as $Al_2O_3$, $Cr_2O_3$ or MgO, or their mixture. However, all of refractory materials such as acidic oxides, for example, $SiO_2$, $TiO_2$ and $ZrO_2$, and calcium aluminate can be used also for preparing the catalyst of the invention. And further a mixture of acidic, neutral and basic refractory materials, and natural refractories such as diatomaceous earth and kaoline may also be used as the refractory material of the catalyst of the present invention.

The following examples show various aspects of the invention in greater detail. It should be understood, however, that these are only illustrative. Other combinations of and variations from the examples shown will no doubt occur to those skilled in the art. And these are considered to be part of the invention.

EXAMPLE 1

Aluminium hydroxide and potassium carbonate in the ratio of 6:1 were admixed and baked at a temperature of 1480° C. to obtain potassium polyaluminate ($\beta''$-$Al_2O_3$), then said polyaluminate was pulverized and was molded in the form of pellets. Thereafter, the pellets were baked at a temperature of 1450° C. to obtain a catalyst. A test gas containing 4% of carbon monoxide and 2000 p.p.m. of hydrocarbons having the similar composition of the exhaust gas of automobiles, was treated by said catalyst under the conditions of 300° C. of the initial reaction temperature, 10,000 vol./vol./hr. of gas space velocity and 300 hrs. of duration. As the result, 71% of carbon monoxide and 62% of hydrocarbons were removed.

EXAMPLE 2

Into 40% of the potassium polyaluminate ($\beta''$-$Al_2O_3$) as prepared in Example 1, 60% of magnesia clinker power was added, and molded in the form of pellets. Then the pellets were baked at a temperature of 1450° C. to obtain a catalyst. A test gas containing 4% of carbon monoxide and 2000 p.p.m. of hydrocarbons having the similar composition of the exhaust gas of automobiles, was treated for 300 hrs. under the conditions of 300° C. of the initial reaction temperature and 10,000 vol./vol./hr. of gas space space velocity. As the result, 65% of carbon monoxide and 60% of hydrocarbons were removed.

EXAMPLE 3

Into 88% of the potassium polyaluminate ($\beta''$-$Al_2O_3$) as prepared in Example 1, 12% of ammonium metavanadate was admixed and molded in the form of pellets. The pellets were baked in an air containing $SO_2$ at a temperature of 480° C. to obtain a catalyst. A test gas containing 8.0% of $SO_2$, 13.0% of $O_2$ and 79.0% of $N_2$ was treated with the catalyst at a temperature of 450–550° C. As the result, 98% of the $SO_2$ was converted.

EXAMPLE 4

The potassium polyaluminate ($\beta''$-$Al_2O_3$) as prepared in Example 1 was molded in the form of pellets and baked at 1450° C., and used as a catalyst carrier. This carrier was soaked with an aqueous solution of hexachloroplatinate, and then it was baked at about 600° C. to obtain a catalyst in which the ratio of Pt:$\beta''$-$Al_2O_3$= 1.0:99.0.

A test gas containing 4% of carbon monoxide and 2000 p.p.m. of hydrocarbons as used in Example 1 was treated with the catalyst for 300 hrs. under the conditions of 300° C. of the initial reaction temperature and 10,000 vol./vol./hr. of gas space velocity. As the result, 96.0% of carbon monoxide and 70.0% of hydrocarbons were removed.

EXAMPLE 5

Aluminum hydroxide and potassium carbonate in the ratio of 8:1 were admixed and baked at a temperature of 1400° C. to obtain potassium polyaluminate ($\beta'$-$Al_2O_3$), then said polyaluminate was pulverized and 100 g. of this was added into an aqueous solution containing 940 g. of ferric nitrate and 60 g. of chromium nitrate, and aqueous ammonia was further added thereto to precipitate iron hydroxide and chromium hydroxide. Thus obtained slurry mixture was well stirred and then was filtered and rinsed with water. The obtained precipitate was dried and baked at 350° C. to convert ferric hydroxide to ferrous oxide.

This baked product was pulverized and molded in form of tablets to obtain a catalyst.

The rate of conversion of carbon monoxide by using the above catalyst was as follows:

(1) Conditions of conversion of carbon monoxide

Gas space velocity (vol./vol./hr.) _____ 800
Steam/carbon monoxide (mol/mol) _____ 3.0
Reaction temperature (° C.) _____ 300–350

(2) Result

Rate of conversion of carbon monoxide ____percent__ 95

(3) Gas composition (percent by volume)

|  | Oil gas | Converted gas |
|---|---|---|
| $CO_2$ | 7.9 | 23.5 |
| $C_3H_6$ | Trace |  |
| $C_2H_4$ | 0.5 | 0.4 |
| $O_2$ | 0.1 | 0.1 |
| CO | 21.5 | 0.8 |
| $CH_4$ | 1.7 | 1.4 |
| $H_2$ | 68.3 | 73.8 |

EXAMPLE 6

Into 88% of the potassium polyaluminate ($\beta''$-$Al_2O_3$) fused alumina abrasive, in fine powders, 65% of finely powdered limonite ($Fe_2O_3 \cdot nH_2O$) and 13% of chromium oxide ($Cr_2O_3$) were added, and 10% of aluminous cement was further added thereto as a binder, and they were mixed well. Then, about 20% of pure water was added into this mixture and kneaded well. Thereafter, the obtained mixture was granulated and hardened by hydration to obtain a catalyst. Thus prepared catalyst was used in the conversion of carbon monoxide in naphtha conversion gas of cyclic process, the result of which is shown in the following.

(1) Conditions of conversion of carbon monoxide

Gas space velocity (vol./vol./hr.) _____ 800
Stream/carbon monoxide (mol/mol) _____ 3.0
Reaction temperature (° C.) _____ 400–450

(2) Result

Rate of conversion of carbon monoxide ____percent__ 78

(3) Gas composition (perecent by volume)

|  | Oil gas | Converted gas |
|---|---|---|
| $CO_2$ | 4.4 | 15.24 |
| $C_3H_6$ | 2.3 | 2.05 |
| $C_2H_4$ | 6.2 | 5.50 |
| $O_2$ | 0.4 | 0.38 |
| CO | 16.4 | 3.60 |
| $CH_4$ | 12.6 | 11.20 |
| $H_2$ | 34.2 | 41.60 |
| $N_2$ | 23.4 | 20.34 |

EXAMPLE 7

The fine powder of the potassium polyaluminate ($\beta''$-$Al_2O_3$) as prepared in Example 1 was formed in pellets and baked at 1450° C. Thus prepared pellets were used as a carrier. The carrier was soaked with 100% solution of cobalt nitrate ($Co(NO_3)_2 \cdot 6H_2O$) and dried at 110° C. Then it was baked at about 500° C. to obtain a catalyst of CO:$\beta''$-$Al_2O_3$=8.0:92.0. A test gas containing 4% of carbon monoxide and 2000 p.p.m. of hydrocarbons and having the similar composition of the exhaust gas of automobiles, was treated with the above-obtained catalyst for 300 hrs. under the conditions of 300° C. of the initial reaction temperature and 50,000 vol./vol./hr. of space velocity. As the result, 84.0% of carbon monoxide and 57.0% of hydrocarbons were removed.

What is claimed is:

1. An oxidation catalyst for catalyzing oxidation reactions in hydrocarbon-oxygen containing mixtures and in $SO_2$-oxygen containing mixtures, said catalyst comprising:
an alkali metal polyaluminate having the formula $R_2O \cdot 7-8Al_2O_3$ or $R_2O \cdot 5-6Al_2O_3$ wherein R is an alkali metal, said polyaluminate being present in said catalyst in amounts sufficient to catalyze said oxidation reaction; and catalyst material selected from the group consisting of at least one metal of manganese, vanadium, silver, tin and compounds thereof formed from drying aqueous salt solutions.

2. The oxidation catalyst of claim 1 wherein said alkali metal is selected from the group of potassium and sodium.

3. The oxidation catalyst of claim 2 and further comprising a different refractory catalyst carrier material admixed with said alkali metal polyaluminate and wherein the alkali polyaluminate content is at least about 0.5 weight percent calculated as the alkali metal oxide of said mixture.

4. The oxidation catalyst of claim 1 wherein said polyaluminate has the formula $K_2O \cdot 5-6Al_2O_3$ and said catalyst is formed by mixing said polyaluminate with ammonium metavanadate and heating said mixture to an elevated temperature.

5. A method for producing an oxidation catalyst comprising the steps of:
compacting into pelletized form a mixture of an alkali metal polyaluminate having a formula of $$R_2O \cdot 5-6Al_2O_3 \text{ or } R_2O \cdot 7-8Al_2O_3$$

wherein R is an alkali metal and a different refractory catalyst carrier material; and thereafter heating said pelletized form to a temperature and for a time sufficient to set said pelletized form.

6. The method of claim 5 wherein said alkali polyaluminate is soaked with a solution of an inorganic salt or organic salt comprising a metal selected from the group consisting of manganese, copper, vanadium, silver and tin, prior to said heating step.

7. A method of producing an oxidation catalyst comprising the steps of mixing an alkali metal polyaluminate having a formula of $R_2O \cdot 5-6Al_2O_3$ or $R_2O \cdot 7-8Al_2O_3$, wherein R is an alkali metal, with a solution of an inorganic salt or organic salt comprising a metal selected from the group consisting of palladium, platinum, cobalt, manganese, chromium, nickel, copper, iron, vanadium, silver and tin, and mixtures thereof, co-precipitating the mixture, recovering the produced precipitate, drying and then granulating same.

References Cited
UNITED STATES PATENTS

| | | | |
|---|---|---|---|
| 2,422,172 | 6/1947 | Smith | 196—50 |
| 2,454,227 | 11/1948 | Smith | 252—434 |
| 3,291,564 | 12/1966 | Kearby | 23—2 |

OTHER REFERENCES

On the Structure of Alkali Polyaluminates, Yamaguchi et al., Bulletin of Chem. Soc. of Japan, January 1968.

DANIEL E. WYMAN, Primary Examiner

W. J. SHINE, Assistant Examiner

U.S. Cl. X.R.

252—463, 465, 466 B